G. E. SAVAGE & L. H. WILKINSON.
PERCOLATING DEVICE.
APPLICATION FILED JULY 1, 1911.
1,026,930.
Patented May 21, 1912.
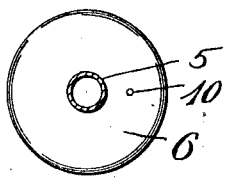
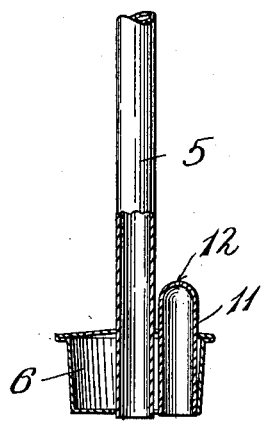
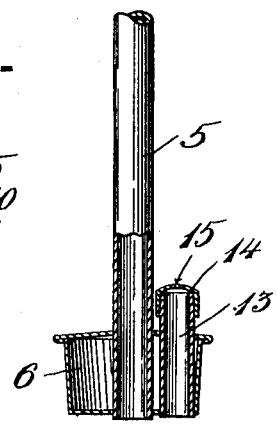
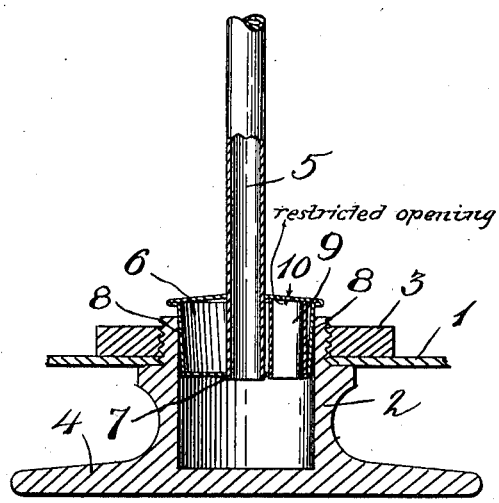
Witnesses:
G. E. Savage
L. H. Wilkinson
Inventors

UNITED STATES PATENT OFFICE.

GEORGE E. SAVAGE AND LOUIS H. WILKINSON, OF MERIDEN, CONNECTICUT, ASSIGNORS TO MANNING, BOWMAN & COMPANY, OF MERIDEN, CONNECTICUT, A CORPORATION OF CONNECTICUT.

PERCOLATING DEVICE.

1,026,930.  Specification of Letters Patent.   Patented May 21, 1912.

Application filed July 1, 1911.  Serial No. 636,417.

*To all whom it may concern:*

Be it known that we, GEORGE E. SAVAGE and LOUIS H. WILKINSON, citizens of the United States, residing at Meriden, New Haven county, State of Connecticut, have invented certain new and useful Improvements in Percolating Devices, of which the following is a full, clear, and exact description.

Our invention relates to improvements in percolator pots and is particularly concerned with an improved construction of percolating tube and heating chamber therefor, which serves materially to shorten the time required for the starting of the percolating operation; which effectively prevents the return of the liquid, admitted to the heating chamber, to the main body of the pot, while, at the same time, the flow to the heating chamber is sufficient at all times to keep said chamber well supplied; and finally, to prevent clogging of the passage from the main body of the pot to the heating chamber.

With these objects in view, the invention consists in a construction and arrangement of parts, preferred embodiments of which are illustrated in the accompanying drawings, in which, Figure 1 is a fragmentary sectional view showing so much of a percolator pot and its heating chamber and tube as is necessary to illustrate the preferred embodiment of the invention; Fig. 2 is a plan view of the percolator tube and the enlargement at its lower end; Fig. 3 is a view similar to Fig. 1 of a modified form of percolator tube; and Fig. 4 is a similar view of a second modified form.

In the embodiment of our invention illustrated in Figs. 1 and 2, 1 indicates a portion of the bottom of a percolator pot to which a heating chamber 2 may be seen to be fastened by means of a nut 3. The heating chamber has an enlargement or disk 4 at its lower end to increase the heating surface, the heat from said disk being conducted directly to the chamber proper. The heating chamber is preferably of uniform diameter from top to bottom, as shown in Fig. 1. The percolating tube 5 has an enlargement 6 at its lower end in the form of a hollow tube or plug. The bottom of said enlargement may be secured to the lower end of the tube as at 7, and its side wall 8 is preferably somewhat cone-shaped to fit snugly and be removably seated within the heating chamber. Within the enlargement 6 is located a preferably tubular member 9 which communicates with a restricted opening 10 in the top of the enlargement, thus forming a passage through the said enlargement from the main body of the pot to the heating chamber when the percolating tube is seated in said chamber, which passage comprises the restricted opening 10 and the enlarged opening immediately below the same formed by the tube 9.

In operation the liquid from the pot feeds comparatively slowly through the restricted opening 10 into the heating chamber 2, filling said chamber and the tube 9 with a comparatively small quantity of liquid, which is quickly raised to the temperature necessary for the percolating operation. When the percolating impulse takes place, the liquid in the heating chamber 2 passes up the percolating tube 5 and tends also to pass up the tubular member 9. In so doing, however, the liquid in the tubular member 9 impinges forcibly against the top of the enlargement adjacent the restricted passage 10, and is thereby thrown back into the heating chamber 2. The rebound of the liquid in the tubular member 9, caused by the reaction from the percolating impulse, tends to create a partial vacuum in the upper end of said tubular member 9 and thereby draws the liquid more or less forcibly from the main body of the pot through the restricted opening 10 to again fill the heating chamber. This process is repeated intermittently as the percolating operations continue. As the top of the enlargement 6 is raised somewhat above the bottom of the pot, there is little tendency of the restricted passage 10 to become clogged. Clogging is further prevented by the impulsive return of a small quantity of liquid through the opening 10 when the percolation takes place.

In the modified form of construction shown in Fig. 3, the tubular member 11 is extended somewhat above the top of the enlargement 6 so that its restricted opening 12 is raised still farther above the bottom of the pot and, consequently, there is still less tendency of said opening to become clogged. Furthermore, the lengthening of the tubular member 11 provides for a longer column of liquid which must be raised by the percolating impulse in the heating chamber and, consequently, the tendency to return said liquid to the main body is further impeded.

In the modification shown in Fig. 4, the tubular member 13, similar in construction and dimension to that illustrated in Fig. 3, may be provided with a removable screw cap 14 having the restricted inlet opening 15 formed therein. By employing the removable cap 14, the interior of the tubular member 13 may be more easily and effectively cleaned.

In all forms of the invention, the hollow enlargement 6 serves effectually to insulate the contents of the main body of the pot from undue heating from the heating chamber.

While we have herein shown preferred embodiments of our invention, it should be understood that the same may be altered in details within the scope of the appended claims.

What we claim is:

1. In a device of the character described the combination of a main chamber; a heating chamber at the base thereof; and a percolating tube having an enlargement at its lower end adapted to be seated within said heating chamber, said enlargement having a restricted opening therethrough communicating with said main chamber and having an enlarged tubular passage communicating with said restricted opening and with said heating chamber.

2. In a device of the character described the combination of a main chamber; a heating chamber at the base thereof; and a percolating tube having a hollow enlargement at its lower end adapted to be seated within said heating chamber, said enlargement having a restricted opening therethrough communicating with said main chamber and having an enlarged passage immediately below and in communication with said restricted opening and with said heating chamber.

3. In a device of the character described, the combination of a main chamber; a heating chamber at the base thereof; and a percolating tube having an enlargement at its lower end shaped to be removably seated within said heating chamber, said enlargement having a restricted opening at its upper portion communicating with said main chamber and having an enlarged passage immediately below said restricted opening and in communication with the latter and with the heating chamber.

4. In a device of the character described the combination of a main chamber; a heating chamber at the base thereof; and a percolating tube having a hollow tubular enlargement at its lower end, said enlargement having a restricted opening in its top in communication with said main chamber and having an enlarged passage formed in said tubular enlargement and in communication with said restricted opening and with said heating chamber.

5. In a device of the character described the combination of a main chamber; a heating chamber at the base thereof; a percolating tube having a hollow enlargement at its lower end shaped to snugly fit within said heating chamber; said enlargement having a restricted opening at its top in communication with said main chamber and an enlarged passage below said restricted opening communicating with the latter and with said heating chamber.

6. In a device of the character described the combination of a heating chamber at the base thereof; a percolating tube having a hollow enlargement surrounding its lower end, the top of said enlargement having a restricted opening formed therein communicating with said main chamber; and a tubular member forming an enlarged passage within said hollow enlargement immediately below said restricted opening and in communication therewith and with the heating chamber to form an intermediate enlargement of the passage from said main chamber to said heating chamber.

GEORGE E. SAVAGE.
LOUIS H. WILKINSON.

Witnesses:
A. L. STETSON,
JOHN A. STERNBERG.

Copies of this patent may be obtained for five cents each, by addressing the "Commissioner of Patents, Washington, D. C."